Sept. 4, 1956 J. E. ROSENZVAIG 2,761,964

SIDEBAND-NOISE VERSUS CARRIER RESPONSIVE SQUELCH SYSTEM FOR FREQUENCY MODULATION RECEIVER

Filed Nov. 30, 1954

INVENTOR,
JAY E. ROSENZVAIG.

BY Harry M. Saragovitz

ATTORNEY.

2,761,964

SIDEBAND-NOISE VERSUS CARRIER RESPONSIVE SQUELCH SYSTEM FOR FREQUENCY MODULATION RECEIVER

Jay E. Rosenzvaig, Tampa, Fla., assignor to the United States of America as represented by the Secretary of the Army Application November 30, 1954, Serial No. 472,269

3 Claims. (Cl. 250—20)

(Granted under Title 35, U. S. Code (1952), sec. 266)

The invention described herein may be used by or for the Government for governmental purposes without the payment of any royalty thereon.

The present invention relates to improved noise suppression or squelch methods and circuits for frequency or phase modulation radio receivers. Circuits of this general type are well known in the art and operate to silence the audio output of the receiver upon the occurrence of a low signal to noise ratio. These circuits also silence the receiver when tuning between stations.

It is the principal object of this invention to provide a new and useful squelch circuit which is independent of noise level and which depends primarily for its operation upon the strength of the carrier signal at the receiver location.

It is a further object of the invention to provide a method of squelch operation of a receiver in response to signal strength which is not subject to improper functioning due to excessive amplitudes of noise level at the receiver.

Yet another object of the invention is to increase the reliability and noise suppression characteristics of frequency modulation receivers.

A still further object of the invention is to provide a new and useful apparatus and method for removing modulation from a frequency modulated signal.

Figure 1:
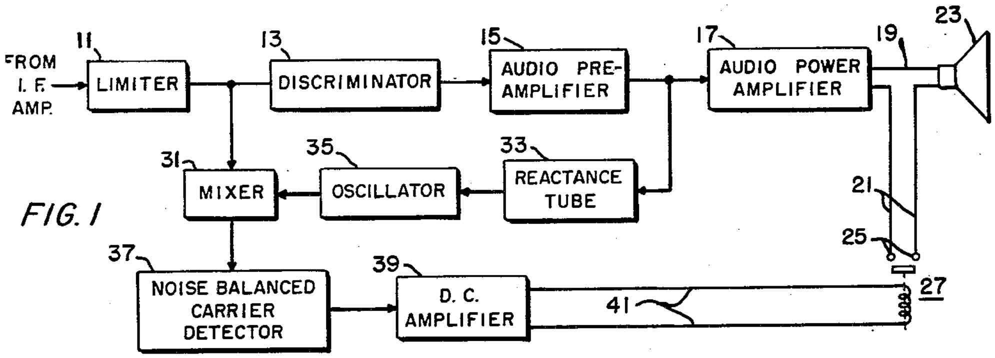
Figure 2:
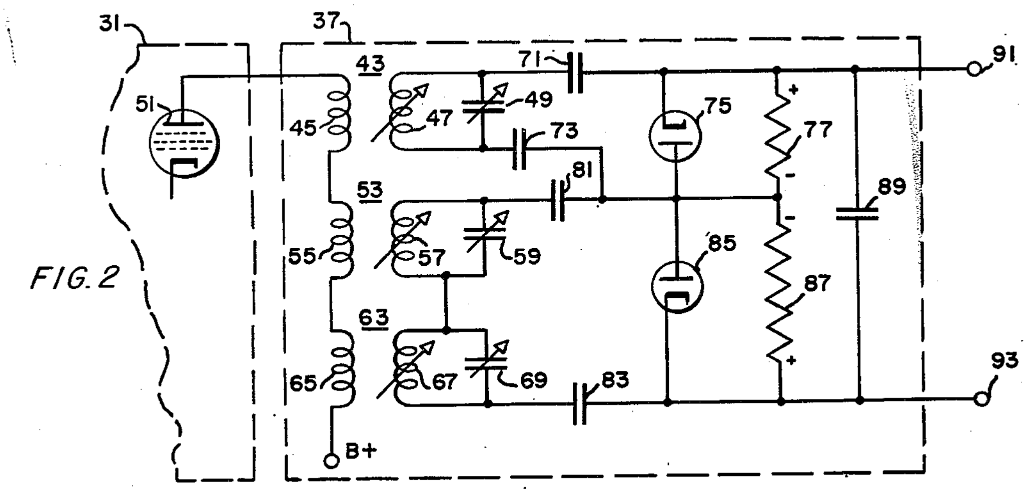
Figure 3:
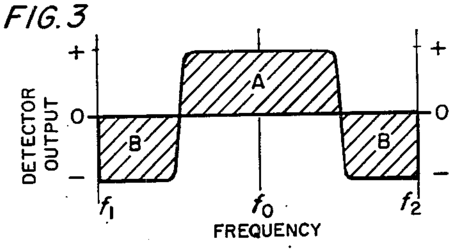
Figure 4:
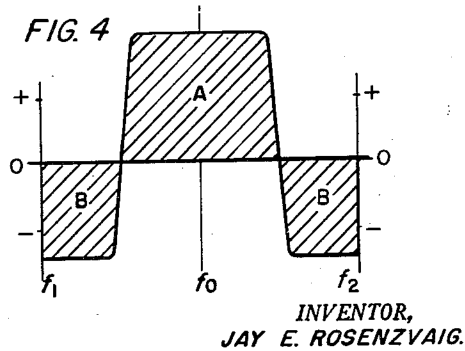
Figure 5:
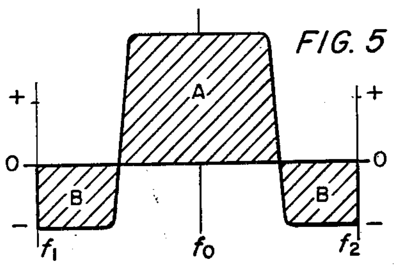

Other features and objects of the invention will become apparent as the same becomes better understood by reference to the following detailed explanation and the drawings wherein:

Fig. 1 is a schematic drawing in block diagram form of an improved portion of a frequency modulation receiver according to the invention, Fig. 2 is a schematic drawing of a portion of the apparatus of Fig. 1 showing the details of the improved squelch circuit, and Figs. 3, 4 and 5 are explanatory diagrams used to describe the operation of the squelch circuit under differing reception conditions.

Referring now to the drawings wherein like reference characters designate similar circuit elements, the frequency, modulation receiver system is shown in Fig. 1. Portions of the receiver which form no part of this invention have been omitted to simplify the disclosure. The receiver elements not shown may be those of any conventional superheterodyne receiver circuit and the input to the portion of the receiver shown is taken as indicated from the intermediate frequency amplifier of such receiver.

The signal input is applied to a conventional limiter circuit 11, the output of which in turn is fed to a frequency discriminator 13. As usual in such receivers the audio output of the frequency discriminator 13 is fed through an audio preamplifier 15 and an audio power amplifier 17 and conductors 19 and 21 to a sound reproducing device 23, such as a loudspeaker or phones. The conductor 21 includes the normally open contacts

25 of a muting or squelch relay 27, whose function will be more fully disclosed hereinafter.

The output of the limiter circuit 11 is also fed to an input of a mixer or converter circuit 31. The output of the audio preamplifier circuit is fed to the control input circuit of a reactance tube 33 which is connected to control the frequency of an oscillator 35. The oscillator 35 provides a second input to the mixer or converter circuit 31. The output of the mixer 31 is connected to the input of a noise balance carrier detector circuit 37, the nature of which will be more fully set forth hereinafter. The output of the noise balanced carried detector circuit is a D. C. voltage which is coupled to the input of a D. C. amplifier or switching tube circuit 39.

The amplifier or switching tube circuit is connected as indicated by leads 41 to the operating coil of the muting relay 27. The amplifier or switching tube circuit 39 may be any of the known prior art circuits which are adapted to operate a relay when the D. C. input voltage thereto exceeds a predetermined magnitude or level.

The circuit of the noise balanced carrier detector is shown schematically in Fig. 2 of the drawing, and its connection to the mixer 31 is also indicated. As shown, the plate 51 of the mixer circuit 31, is connected to its source of supply B+ through a circuit including the primaries 45, 55 and 65 of a plurality of high frequency transformers 43, 53 and 63 respectively. The secondary circuits of these transformers are tuned. The secondary winding 47 is shunted by a trimmer condenser 49 to form a first parallel resonant circuit. This circuit is connected through suitable coupling condensers 71 and 73 to a detector consisting of a diode 75 shunted by a resistor 77. The diode 75 may be either of the thermionic or crystal contact type.

The secondary winding 57 is shunted by a trimmer condenser 59 to form a second parallel resonant circuit. The secondary winding 67 is similarly shunted by a trimmer condenser 69 to form a third parallel resonant circuit. The second and third parallel resonant circuits are connected in series and are further connected through suitable coupling condensers 81 and 83 to a detector consisting of a diode 85 shunted by a resistor 87. The detector resistors 77 and 87 are connected in series opposition and are adapted to have voltages developed across them whose polarities are indicated by the positive and negative signs on the drawing. Resistors 77 and 87 may be shunted by a condenser 89 of such magnitude that the time constant of the circuit is such as to prevent chattering of the relay 27. The outputs of the detectors are brought out to a pair of terminals 91 and 93 for connection to the amplifier or switching tube circuit 39.

The operation of the receiver and its squelch circuit will now be described. It is, of course, the function of the muting or squelch circuit to complete the audio circuit of the receiver only when a signal of predetermined strength is being received. The present system is intended to respond to receive signal strength only, spurious signals or noise being ineffective to cause operation of the audio system.

The receiver has a pass-band of intermediate frequencies. This intermediate frequency pass-band is fed to mixer 31 and beat with the output of oscillator 35 to produce a displaced pass-band having a lower frequency $f_1$ and an upper frequency $f_2$, the center frequency of the displaced pass-band being designated $f_0$. The elements of the noise balance carrier detector are set up with respect to these frequencies. The secondary circuit of the transformer 43 is tuned to the mid-frequency $f_0$ of the displaced pass-band of the receiver. The tuning of this circuit may be set by adjustment of the variable trimmer denser 49 or the variable constants of the transformer secondary 47 as is well known in the art. Similarly the secondary circuit of the transformer 53 is tuned approximately to the limit $f_1$ of the displaced pass-band and the secondary circuit of the transformer 63 is tuned approximately to the upper limit $f_2$ of the pass-band. When the noise balance carrier detector is correctly tuned, the output voltage between terminals 91 and 93, with no signal applied to the receiver input, will be zero, and the zero crossings of the detector response curve will be symmetrically located about the $f_0$ and will be approximately half-way between $f_0$ and the lower and upper frequency limits of the displaced pass-band.

A condition will first be assumed where there is no carrier signal present and noise voltages only are being passed by the intermediate frequency amplifier and the limiter circuit. Voltages due to noise are not limited to any particular frequency but tend to cover the entire intermediate frequency pass-band of the receiver. As these voltages pass through the mixer 31 the noise voltages similarly cover the entire range of the displaced pass-band and are applied from the output of the mixer to the noise balanced carrier detector. The condition illustrated in Fig. 3 now exists. Fig. 3 is a plot of detector output voltage over the frequency spectrum of the displaced pass-band of the receiver. The output of detector 75 is indicated by the portion of the curve centered about $f_0$ and enclosing the hatched area A above the zero axis. The output detector 85 is indicated by the two portions of the curve in the vicinity of frequency limits $f_1$ and $f_2$ and enclosing the hatched areas B below the zero axis. The output curve portion near $f_1$ is due to the voltage induced in the transformerd secondary 57 which is tuned to the lower frequency limit. The curve portion near $f_2$ is due to the voltage induced in the transformer secondary 67 which is tuned to $f_2$.

The detectors 75 and 85 have their output circuits connected in series opposition across the output terminals 91 and 93. It will be apparent from Fig. 3 that the detector output curve due to noise alone encloses substantially equal areas above and below the zero axis, and as a result the net output of the combined detectors or the voltage across output terminals 91 and 93 is zero. This output voltage is applied as a control voltage to the input of the D. C. amplifier or switching tube circuit 39 which in the absence of a positive control voltage does not conduct sufficient current to pick up the relay 27. As a result the relay does not operate at this time and the output circuit of the audio power amplifier remains open.

A second condition of operation of the circuit will now be considered where a frequency modulated carrier signal is present at the receiver and the input from the intermediate frequency amplifier contains both a frequency modulated signal and control voltages. This condition of operation is illustrated in Fig. 4 and Fig. 5. Fig. 4 is a detector output curve plotted similarly to that of Fig. 3 and illustrating the results which would be obtained if the reactance tube 33 of Fig. 1 were disabled. The noise voltages present in the system would produce a detector output similar to that illustrated in Fig. 3. The frequency modulated signal unfortunately covers a range substantially equal to the intermediate frequency pass-band of the receiver, and consequently the output of the control detectors 75 and 85 while increasing in magnitude exhibits the same cancelling effect as the noise voltages. It will be noted that the areas at both A and B of Fig. 4 are larger than those of Fig. 3. The area A about the center frequency $f_0$ increases to a somewhat greater degree than the areas B in the vicinity of the limit frequencies $f_1$ and $f_2$. This is due to a greater proportion of the modulation occurring in the neighborhood of the center frequency. The resultant output of the two detector circuits, as illustrated in Fig. 4, would be a small net positive control voltage which would be applied to the D. C. amplifier circuit 39 and which might conceivably be sufficient to operate the relay 27 and close its contacts 25. The control operation, however, would be unsatisfactory and not of a sufficiently positive nature to properly operate the squelch relay.

The circuit elements including mixer 31, reactance tube 33 and oscillator 35 operate, however, to correct the above described condition. Briefly, the purpose of these elements is to eliminate or remove the frequency modulation from the displaced pass-band frequency applied to the circuits of the detectors 75 and 85. This is accomplished in a manner similar to that of an automatic frequency control loop. The audio voltage is taken off at any point following the discriminator 13 and is representative of the existing modulation. This audio voltage is fed to the reactance tube 33 as a control voltage. Reactance tube 33 is so set up that the "direction" and amplitude of the effective reactance change shifts the frequency of the oscillator 35 by such an amount that the beat between it and the intermediate frequency is a constant frequency. This frequency, which is the output of the mixer 31, is the center frequency $f_0$ of the displaced pass-band. The mixer output voltage is proportional to the incoming signal but has no modulation impressed thereon.

When the mixer output voltage at a frequency $f_0$ is applied to the detectors the conditions illustrated in Fig. 5 exist. The noise components present cover the band from $f_1$ to $f_2$ and produce negative voltage areas at B which are substantially the same as those illustrated in Fig. 3. No frequency modulation is applied to the wave to increase them as in the case discussed for Fig. 4. The area A, however, centered about the frequency $f_0$ is increased in size due to the application of the voltage output of the mixer 31, which is proportional to the incoming signal. A large unbalance between the positive and negative areas now exists which results in a large value of positive control voltage appearing at terminals 91 and 93 to operate the squelch relay 27. The relay, therefore, operates in response to the presence of an incoming signal to close its contacts 25 to complete the audio circuit.

It is obvious that the control voltage output of the detectors may be applied to overcome a high negative bias on an audio amplifier tube normally biased to cut-off if desired. This expedient is only the equivalent of the magnetically actuated relay shown.

The present invention provides a squelch circuit which operates in response to a signal from which the modulation has been eliminated. The elimination of the modulation allows the development of a strong positive control signal for squelch purposes, while at the same time eliminating the possibility of any faulty operation of the squelch circuit due to noise. The improved squelch system may thus be made much more sensitive and certain in its operation than those of the prior art.

While there has been described what is at present considered to be the preferred embodiment of this invention, it will be obvious to those skilled in the art that various changes and modifications may be made therein without departing from the invention, and it is therefore the aim of the appended claims to cover all such changes and modifications as fall within the true spirit and scope of the invention.

What is claimed is:

1. In a frequency modulation receiver system having a pass-band of intermediate frequencies, a frequency modulation detector means producing an audio output from said intermediate frequencies, a variable frequency oscillator circuit responsive to said audio frequencies, a mixer circuit responsive to said pass-band of intermediate frequencies and the output of said variable frequency oscillator to develop a pass-band of displaced frequencies, a first tuned detector means responsive to the center frequency of said pass-band of displaced frequencies, second tuned detector means responsive to the upper and lower limits of said pass-band of displaced frequencies, means connecting the outputs of said first and second tuned detector means in series opposition to produce a control voltage, and means responsive to the magnitude of said control voltage to disable said receiver system.

2. In a frequency modulation receiver system having an intermediate frequency channel with pass-band characteristics, a frequency modulation detector connected to said intermediate frequency channel, an audio system connected to the output of said frequency modulation detector, a variable frequency oscillator circuit including a reactance tube having a control element, means connecting the output of said frequency modulation detector to the control element of said reactance tube, heterodyne mixer means having a pair of inputs connected to said intermediate frequency channel and to said variable frequency oscillator respectively to produce a pass-band of displaced frequencies, a first tuned detector means responsive to the center frequency of said pass-band of displaced frequencies, a second tuned detector means responsive to the upper and lower limits of said pass-band of lower frequencies and means responsive to the difference in output of said tuned detector means falling below a predetermined level to disable said audio system.

3. In a frequency modulation system having a pass band of intermediate frequencies, a frequency modulation detector means producing an audio output from said intermediate frequencies, a variable frequency oscillator circuit responsive to said audio frequencies, a mixer circuit responsive to said pass band of intermediate frequencies and the output of said variable frequency oscillator to develop a pass band of displaced frequencies, a first means responsive to the center frequency of said pass band of displaced frequencies, a second means responsive to the upper and lower limits of said pass band of displaced frequencies, means connecting the outputs of said first and second means in series opposition to produce a control voltage and means responsive to the magnitude of said control voltage to disable said receiver system.

References Cited in the file of this patent

UNITED STATES PATENTS

| | | |
|---|---|---|
| 2,227,415 | Wolff | Dec. 31, 1940 |
| 2,510,906 | Reid | June 6, 1950 |

FOREIGN PATENTS

| | | |
|---|---|---|
| 433,164 | Great Britain | Aug. 9, 1935 |
| 797,805 | France | Feb. 24, 1936 |
| 954,813 | France | June 20, 1949 |